United States Patent
Parham

(10) Patent No.: US 8,104,723 B2
(45) Date of Patent: Jan. 31, 2012

(54) MOUNTING PEDESTAL

(75) Inventor: Kevin Parham, Orlando, FL (US)

(73) Assignee: State of Florida, Department of Transportation, Tallahassee, FL (US)

(*) Notice: Subject to any disclaimer, the term of this patent is extended or adjusted under 35 U.S.C. 154(b) by 547 days.

(21) Appl. No.: 12/283,088

(22) Filed: Sep. 9, 2008

(65) Prior Publication Data

US 2010/0133403 A1  Jun. 3, 2010

(51) Int. Cl.
*F16M 11/08* (2006.01)

(52) U.S. Cl. ........... 248/186.2; 248/176.1; 248/176.3

(58) Field of Classification Search ........... 248/188.1, 248/127, 158, 176.1, 177.1, 186.1, 178.1, 248/186.2, 176.3; 108/150, 158, 158.11, 108/191; 40/607.1; 211/56, 58, 78, 95, 115, 211/70; 396/419, 421, 427, 428
See application file for complete search history.

(56) References Cited

U.S. PATENT DOCUMENTS

| | | | | |
|---|---|---|---|---|
| 3,153,524 | A | * | 10/1964 | Greenfield et al. ........ 248/158 |
| 4,448,378 | A | * | 5/1984 | Binfare ........ 248/188.7 |
| 4,634,090 | A | * | 1/1987 | Currie et al. ........ 248/544 |
| 4,789,122 | A | * | 12/1988 | Gutgsell ........ 248/188.7 |
| 4,807,838 | A | * | 2/1989 | Anderson ........ 248/188.1 |
| 2005/0103957 | A1 | * | 5/2005 | Chang ........ 248/127 |
| 2007/0007402 | A1 | * | 1/2007 | Dierkes ........ 248/127 |
| 2008/0230659 | A1 | * | 9/2008 | Kennedy ........ 248/158 |
| 2008/0265112 | A1 | * | 10/2008 | Pascual et al. ........ 248/176.1 |

* cited by examiner

Primary Examiner — A. Joseph Wujciak, III
(74) Attorney, Agent, or Firm — J. Wiley Horton

(57) ABSTRACT

The present invention comprises a mounting pedestal for a device, such as a laser scanner. The mount is generally comprised of a base, a triangle bracket and an attachment screw. The base has a base plate and a support attached to the top of the base plate. The support is hollow, preferably cylindrical in shape, has an access opening on the side and a central opening on top. A triangle bracket is bolted onto the top of the support, covering the central opening on the support. The triangle bracket houses a pivot bracket. The attachment screw fits through and is engaged by the pivot bracket on the triangle bracket. A device, such as a laser scanner, is supported by the triangle bracket and is fixed in place by the threads on the attachment screw. The attachment screw is accessed and can be tightened or loosened through the access opening on the support.

19 Claims, 11 Drawing Sheets

US 8,104,723 B2

MOUNTING PEDESTAL

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of mounting devices. More specifically, the invention comprises a semi-permanent mounting pedestal for a device such as a laser scanner.

2. Description of the Related Art

Mounting devices are typically used to mount surveying transits and scanning devices, such as laser scanners. This type of equipment requires a stable mount capable of producing a stable base which allows the equipment to collect accurate data and information from the surrounding environment. The equipment referred to is commonly used in civil engineering and the construction industry.

As an example, a laser scanner device must be placed in a stable position in order to effectively scan a building, bridge or other structure. Tripods, which are three-legged stands, are often used to stabilize, elevate and level a laser scanner. If a tripod is brought to a site the laser scanner can be placed on top of the tripod and information can be collected. However, there are many sites where it is difficult to set up a tripod. For example, bridges are often over water or soft land, both which are not ideal for setting up a tripod.

Additionally, when analyzing a structure the user may need to obtain data over an extended period of time. For example, the user may scan a bridge on a set interval to determine whether the bridge is subsiding over time. In this instance it would be desirable for the user to attach a device, such as a laser scanner, on a mount that is semi-permanently or permanently attached to a surrounding structural object, such as a bridge fender or a concrete barrier. A tripod would not achieve this objective. A weather resistant fixed mount would allow the user to attach and remove the laser scanner quickly without changing the location of the laser scanner in relation to structure being analyzed.

Therefore what is needed is a sturdy mount that can be permanently or semi-permanently affixed to a surrounding structure such that the user can attach a device, such as a laser scanner. The present invention achieves this objective, as well as others that are explained in the following description.

BRIEF SUMMARY OF THE INVENTION

The present invention comprises a mounting pedestal for a removable device. The mount generally comprises a base, a triangle bracket and an attachment screw. The base has a base plate and a support attached to the top of the base plate. The support is preferably hollow, cylindrical in shape, has an access opening on its side and a central opening on its top. A triangle bracket is bolted onto the top of the support, covering the central opening on the support. The triangle bracket houses a pivot bracket. An attachment screw fits through and is engaged by the pivot bracket on the triangle bracket. A prior art device such as a laser scanner sits on and is supported by the triangle bracket and is fixed in place by the threads on the attachment screw. The attachment screw is accessed and can be tightened or loosened through the access opening on the support.

The mount can be attached to a fixed object, possibly a bridge fender or a concrete barrier, in order to provide the user with a sturdy and permanent location to attach and detach the mounted device.

Figure 1:
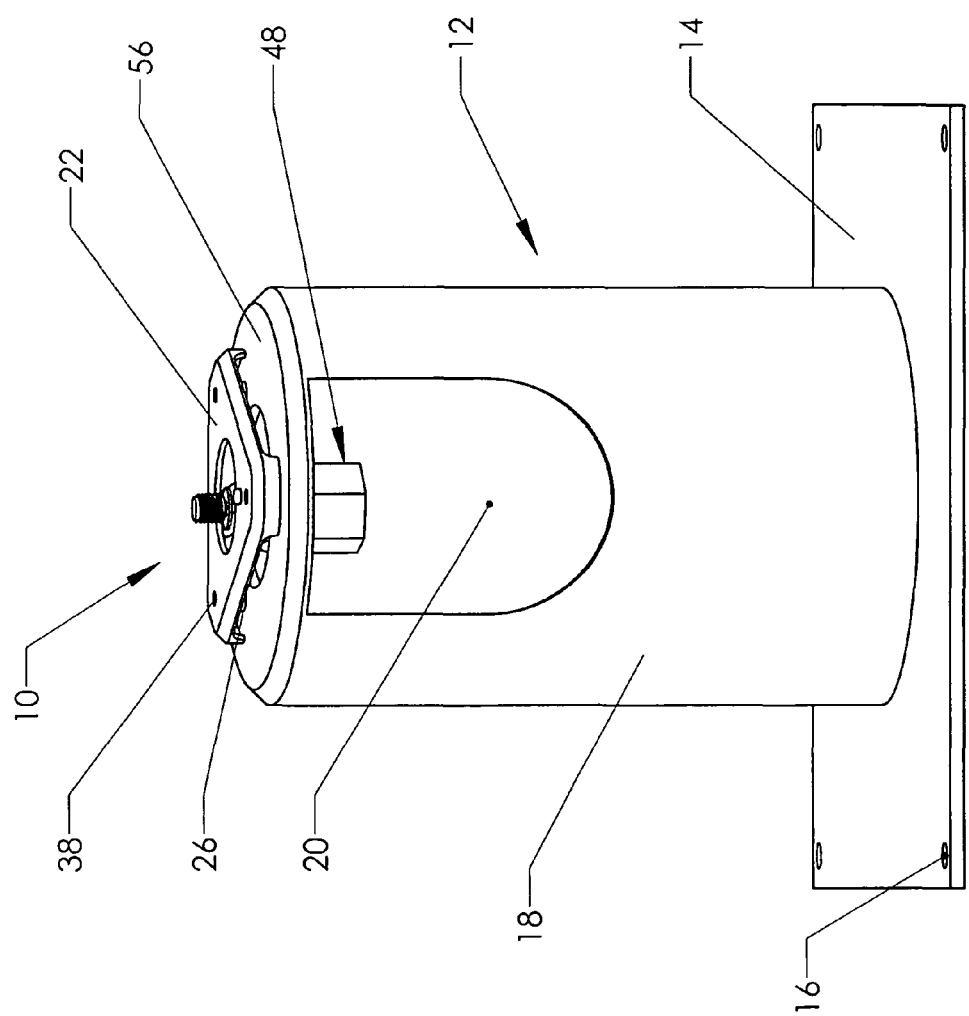
FIG. 1 is a perspective view, showing the present invention.

| REFERENCE NUMERALS IN THE DRAWINGS | | | |
|---|---|---|---|
| 10 | mount | 12 | base |
| 14 | base plate | 16 | base bolt hole |
| 18 | support | 20 | access opening |
| 22 | triangle bracket | 24 | fixed bolt |
| 26 | spacer | 28 | screw handle |
| 30 | central opening | 32 | top bolt hole |
| 34 | central bolt hole | 36 | pivot bracket |
| 38 | triangle bracket bolt hole | 40 | stiffening wall |
| 42 | pivot bolt | 44 | enlarged slide opening |
| 46 | extended slide opening | 48 | attachment screw |
| 50 | threads | 52 | anchor |
| 54 | tri-bracket opening | 56 | ledge |
| 58 | laser scanner | 60 | scanner base |
| 62 | scanner knob | 64 | female receiver |
| 66 | bridge underside | 68 | bridge fender |
| 70 | tri-bracket surface | 72 | water |
| 74 | interior space | 76 | concrete barrier |
| 78 | bridge | 80 | runner |
| 82 | slot | | |

DETAILED DESCRIPTION OF THE INVENTION

Figure 2:
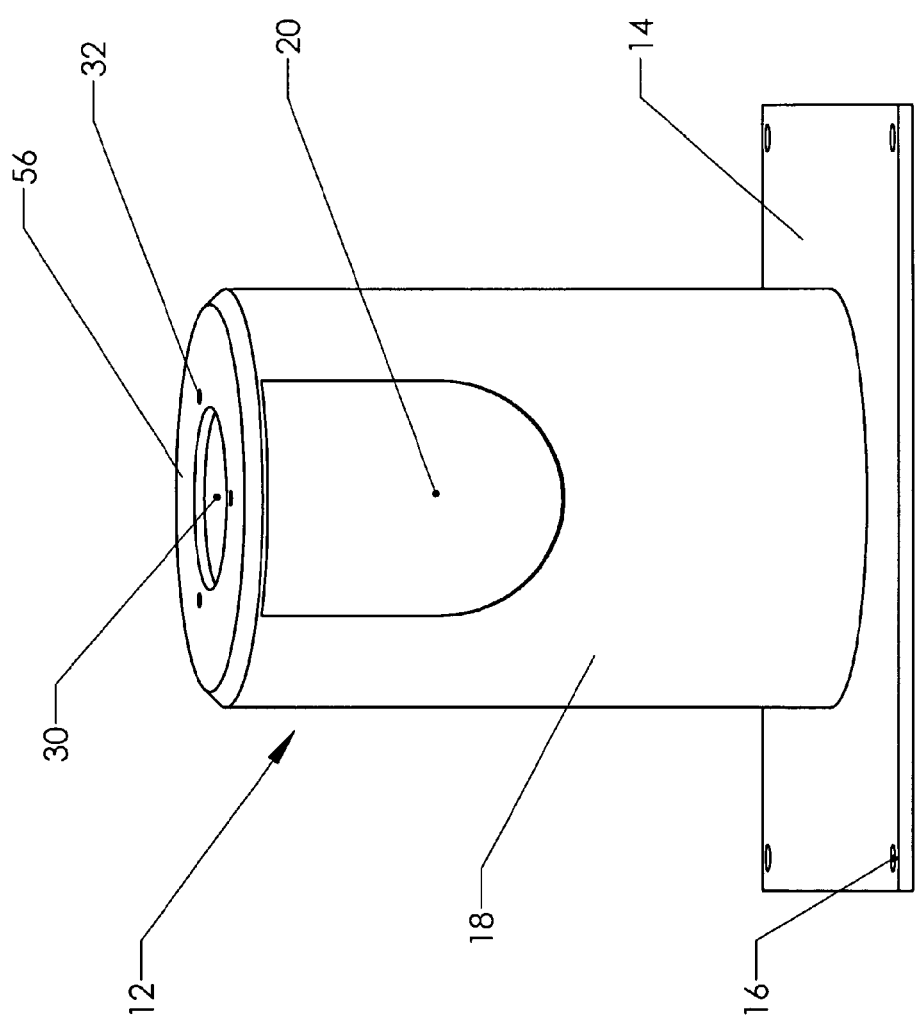
FIG. 2 is a perspective view, showing the base of the present invention.

FIG. 1 illustrates the present invention in the preferred embodiment. Mount 10 is primarily comprised of base 12, triangle bracket 22 and attachment screw 48. Mount 10 is preferably made of a weather resistant metal such as aluminum or stainless steel. As shown in FIG. 2 base 12, in the preferred embodiment is one integrated unit. Base 12 is made up of base plate 14, support 18, and ledge 56. Support 18 is hollow and has access opening 20 located proximate to ledge 56. Ledge 56 has a central opening 30 and three top bolt holes 32. The lower end of support 18 is preferably welded to the top of base plate 14. However any manner of attaching support 18 to base plate 14 can be used. In the preferred embodiment base plate 14 has four base bolt holes 16 used to attach base plate 14 to a fixed object, such as a bridge fender or a concrete barrier.

Figure 3:
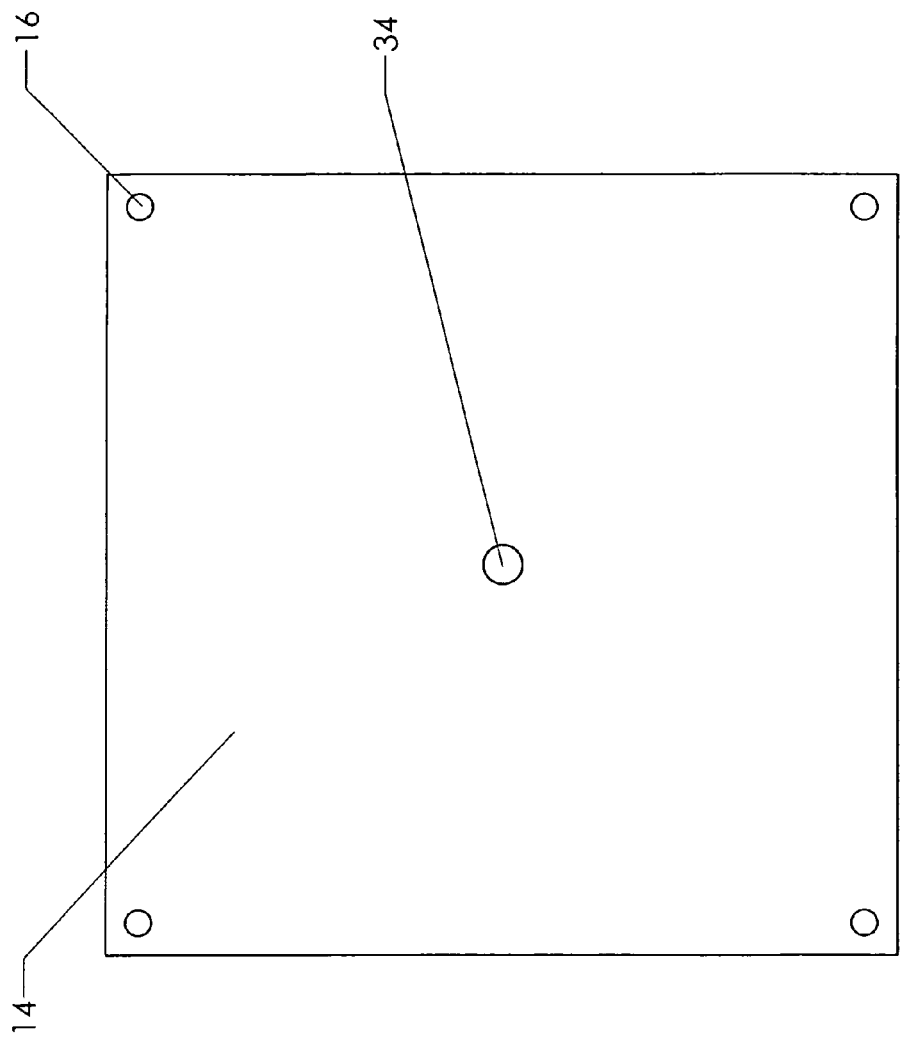
FIG. 3 is a bottom view, showing the bottom of the base plate of the present invention.

In a view from underneath base plate 14 FIG. 3 shows a fifth central bolt hole 34. Central bolt hole 34 can be accessed from access opening 20, shown in FIG. 2. Again, central bolt hole 34 can be used to attach base plate 14 to a fixed object. Other mounting fixtures can be added to the base plate to suit a particular location.

Figure 4:
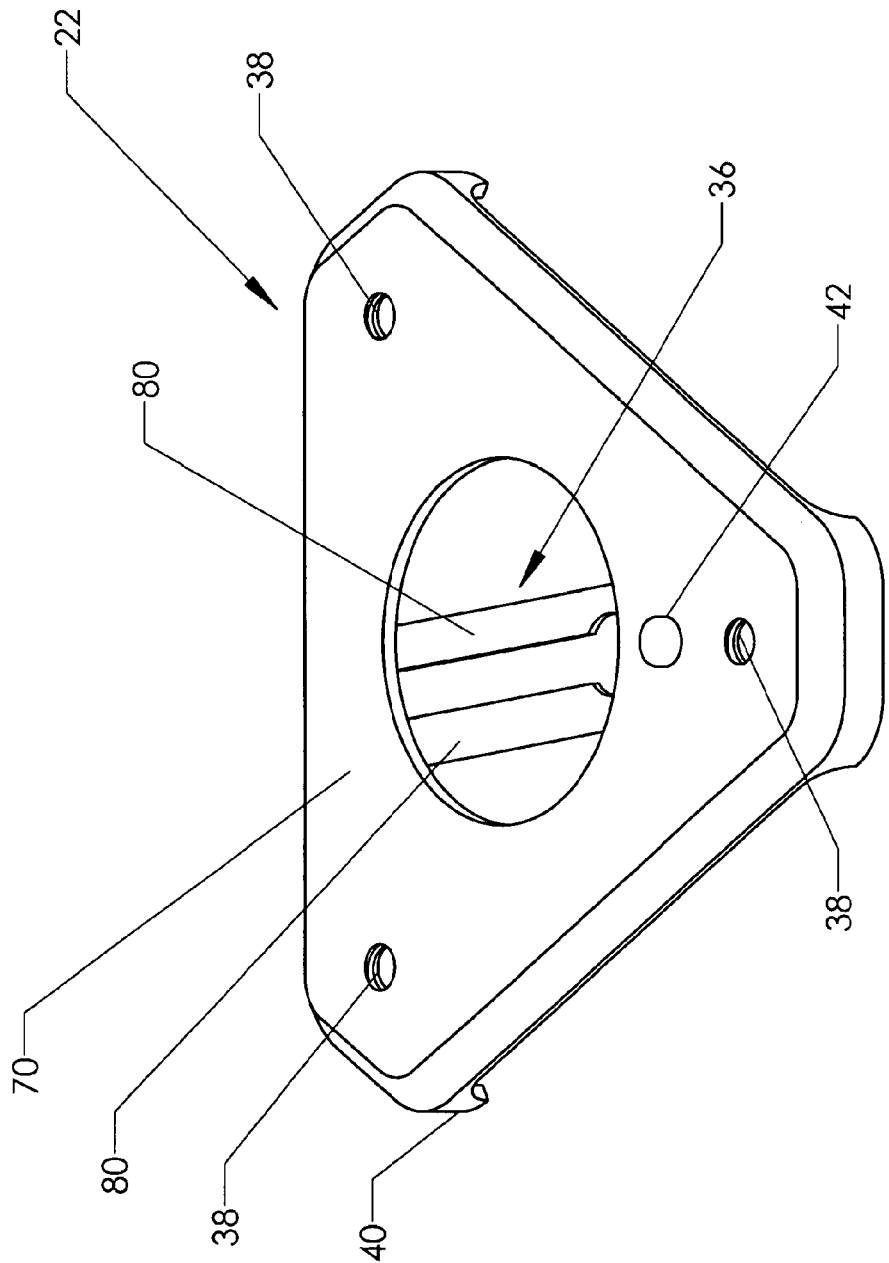
FIG. 4 is a perspective view, showing the triangle bracket of the present invention.
Figure 5:
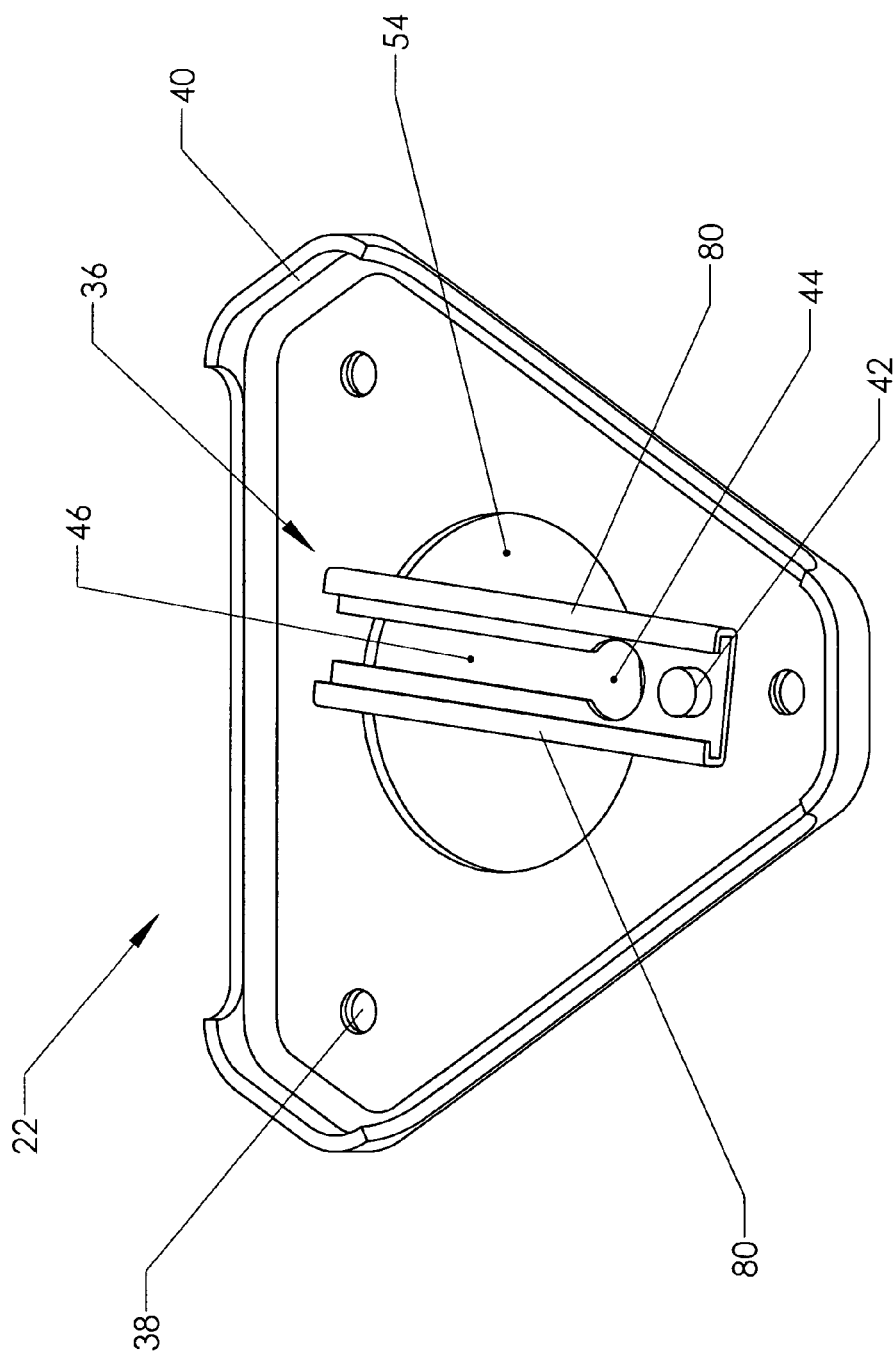
FIG. 5 is a perspective view, showing a view from underneath the triangle bracket of the present invention.

FIG. 4 shows tri-bracket 22 of the present invention in more detail. As seen in FIG. 1 triangle bracket 22 is located on top of ledge 56. In the preferred embodiment triangle bracket 22 is attached to ledge 56 by way of three fixed bolts 24 which travel through the three top bolt holes 32 on base 12 (shown in FIG. 2) and thread into the three triangle bracket bolt holes 38 on triangle bracket 22. Returning to FIG. 4, triangle bracket 22 has a generally triangular shape with three long sides and three short walls at the corners of the triangle. On each short wall is located a downward-turned stiffening wall 40 which extends away from triangle bracket surface 70. In the center of triangle bracket 22 there is a circular triangle bracket opening 54. Pivot bracket 36 lies across triangle bracket opening 54, pivotally attaching to triangle bracket surface 70 at pivot bolt 42. FIG. 5 shows a view from underneath triangle bracket 22. Pivot bracket 36 can be seen in greater detail from this perspective. Pivot bracket 36 is made up of two runners 80 joined by a bridge. Runners 80 form slot 82 which has an enlarged slide opening 44 at one end and extended slide opening 46 at the other end. Enlarged slide opening 44 is circular in appearance and offset to one side of pivot bracket 36. Extended slide opening 46 spans the length of pivot bracket 36 up to and connecting with enlarged slide opening 44. The diameter of enlarged slide opening 44 is greater than the width across extended slide opening 46. Pivot bracket 36 is pivotally attached to triangle bracket surface 70 at pivot bolt 42. The pivotal attachment allows pivot bracket 36 to pivot across triangle bracket opening 54 allowing the user to adjust pivot bracket 36 accordingly within triangle bracket opening 54.

Figure 6:
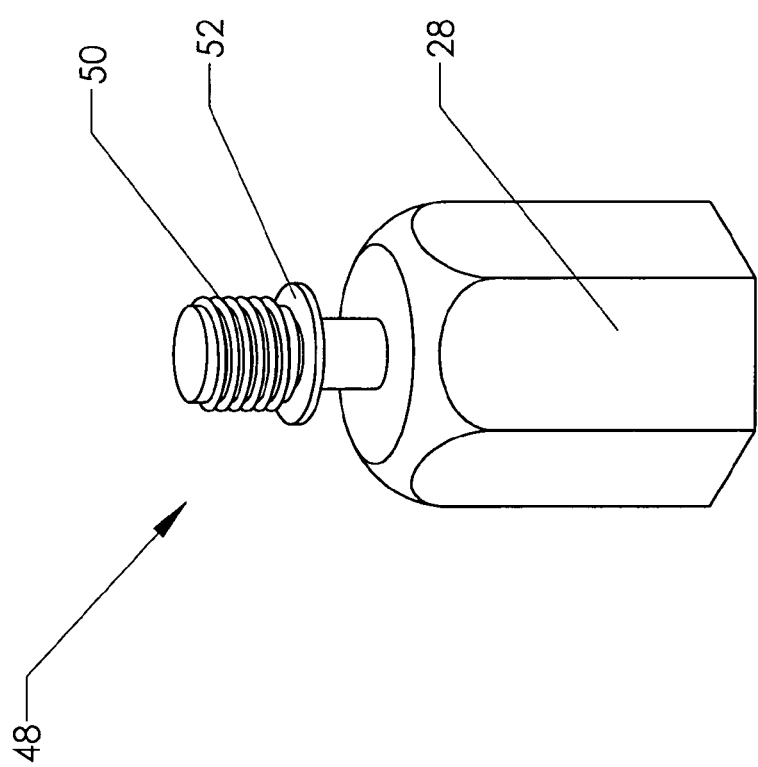
FIG. 6 is a perspective view, showing the attachment screw of the present invention.

Attachment screw 48 is shown in FIG. 6. Attachment screw 48 is generally made up of threads 50, anchor 52 and screw handle 28. The design of anchor 52 is such that the shape and size correspond to the shape and size of enlarged slide opening 44, seen in FIG. 5. Thus, the user can fit anchor 52 through enlarged slide opening 44 and shift attachment screw 48 to extended slide opening 46. When engaged anchor 52 lies on top of pivot bracket 36 and can only be removed by alignment with enlarged slide opening 44.

Attachment screw 48 is accessed through access opening 20 in support 18, shown in FIG. 1. Screw handle 28 can be used to thread or unthread attachment screw 48, into a female threaded cavity on the device to be mounted, such as female receiver 64 on laser scanner 58, as shown in FIG. 9.

Figure 7:
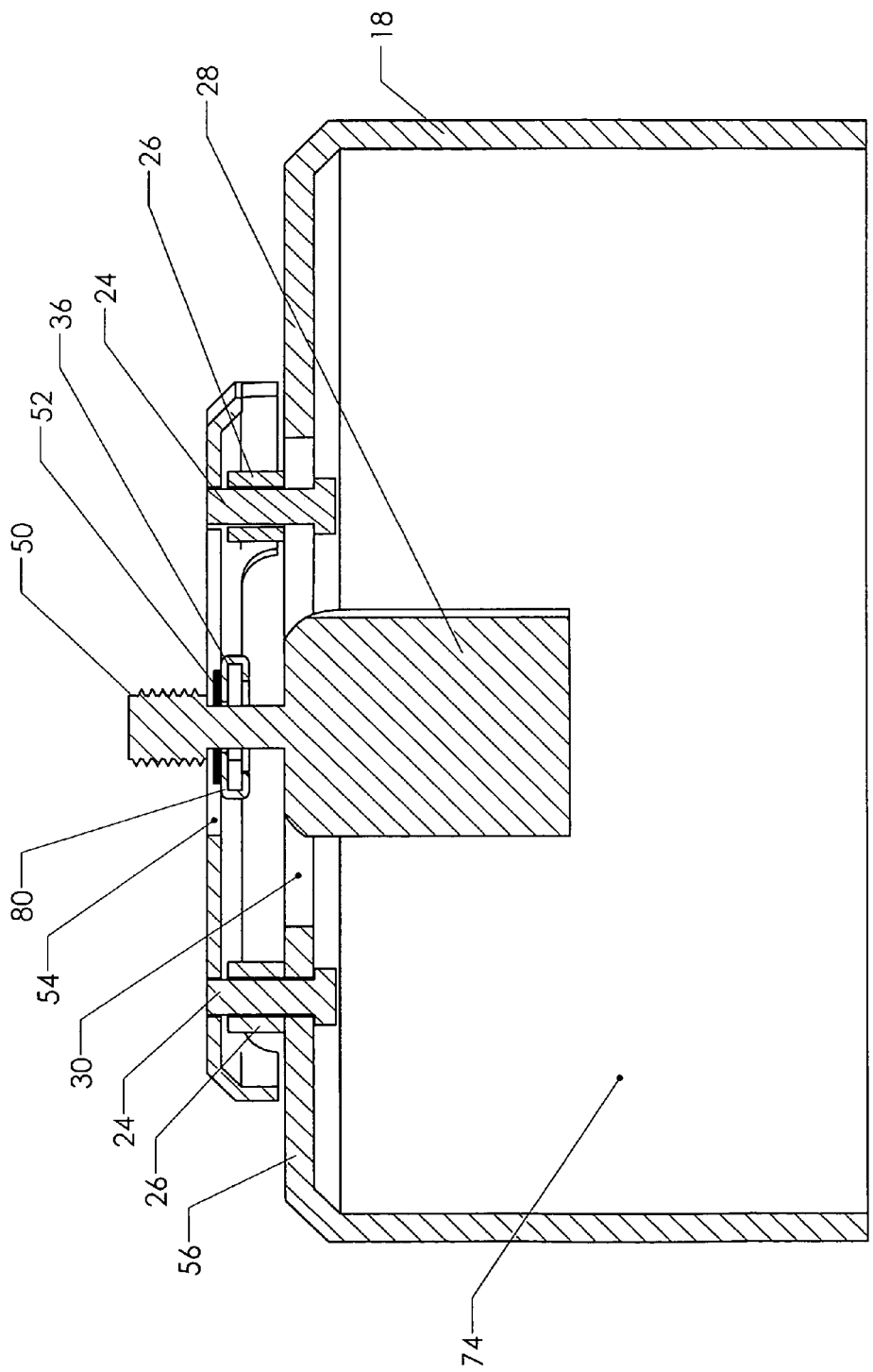
FIG. 7 is a cross-section view, showing the top of the present invention.

A cross-section view of the invention is shown in FIG. 7. Support 18 is made up of exterior walls surrounding a hollow interior space 74. Triangle bracket 22 attaches to ledge 56. In the preferred embodiment three fixed bolts 24 passes through ledge 56 and spacer 26, and threads into tri-bracket 22. Spacer 26 optionally surrounds fixed bolt 24 and separates triangle bracket 22 from ledge 56. Spacer 26 can be any width in order to set triangle bracket 22 above ledge 56 at the desired height. Additionally, spacers 26 with different widths can be used at the three corners of triangle bracket 22 to provide a gross leveling function. Alternatively, stacks of more than one spacer 26 can be used to adjust the height of triangle bracket 22. The bottom of anchor 52 rests against the top of runners 80 in order to keep attachment screw 48 from falling downward out of pivot bracket 36 when not in use.

Figure 8:
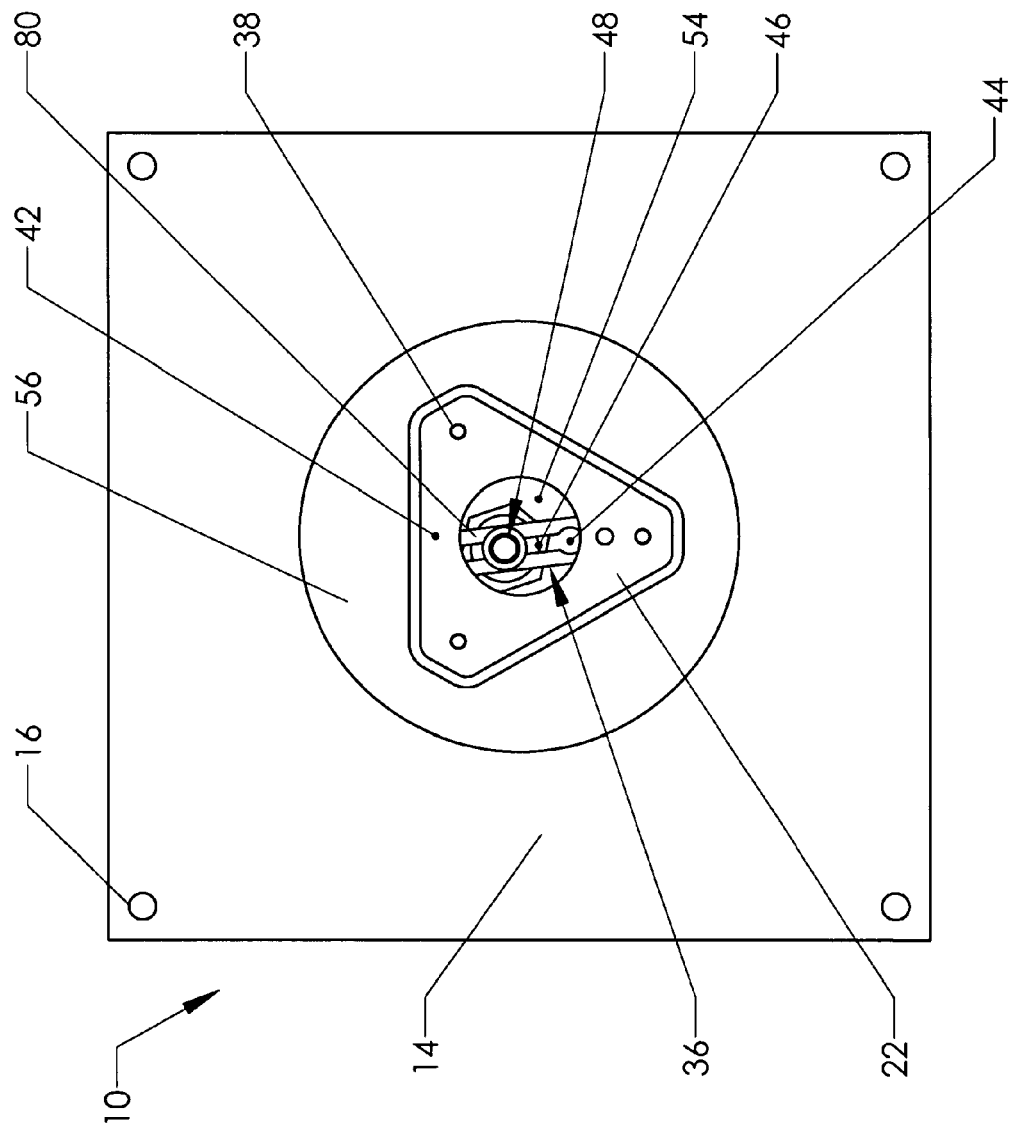
FIG. 8 is perspective view, showing the present invention from overhead.

An overhead view of the present invention is shown in FIG. 8. In the preferred embodiment base bolt holes 16 are located at the four corners of base plate 14. Ledge 56 is positioned at the center of base plate 14 and triangle bracket 22 is located at the center of ledge 56. Pivot bolt 42 attaches pivot bracket 36 to tri-bracket 22. In the preferred embodiment pivot bracket 36 is attached to triangle bracket 22 such that pivot bracket 36 has approximately a 45 degree swing at pivot bolt 42 within triangle bracket opening 54. Additionally, attachment screw 48 can move from one end of extended slide opening 46 to the other. The ability for attachment screw 48 and pivot bracket 36 to move within triangle bracket opening 54 allows the user to mount the laser scanner in the desired location on top of mount 10.

Figure 9:
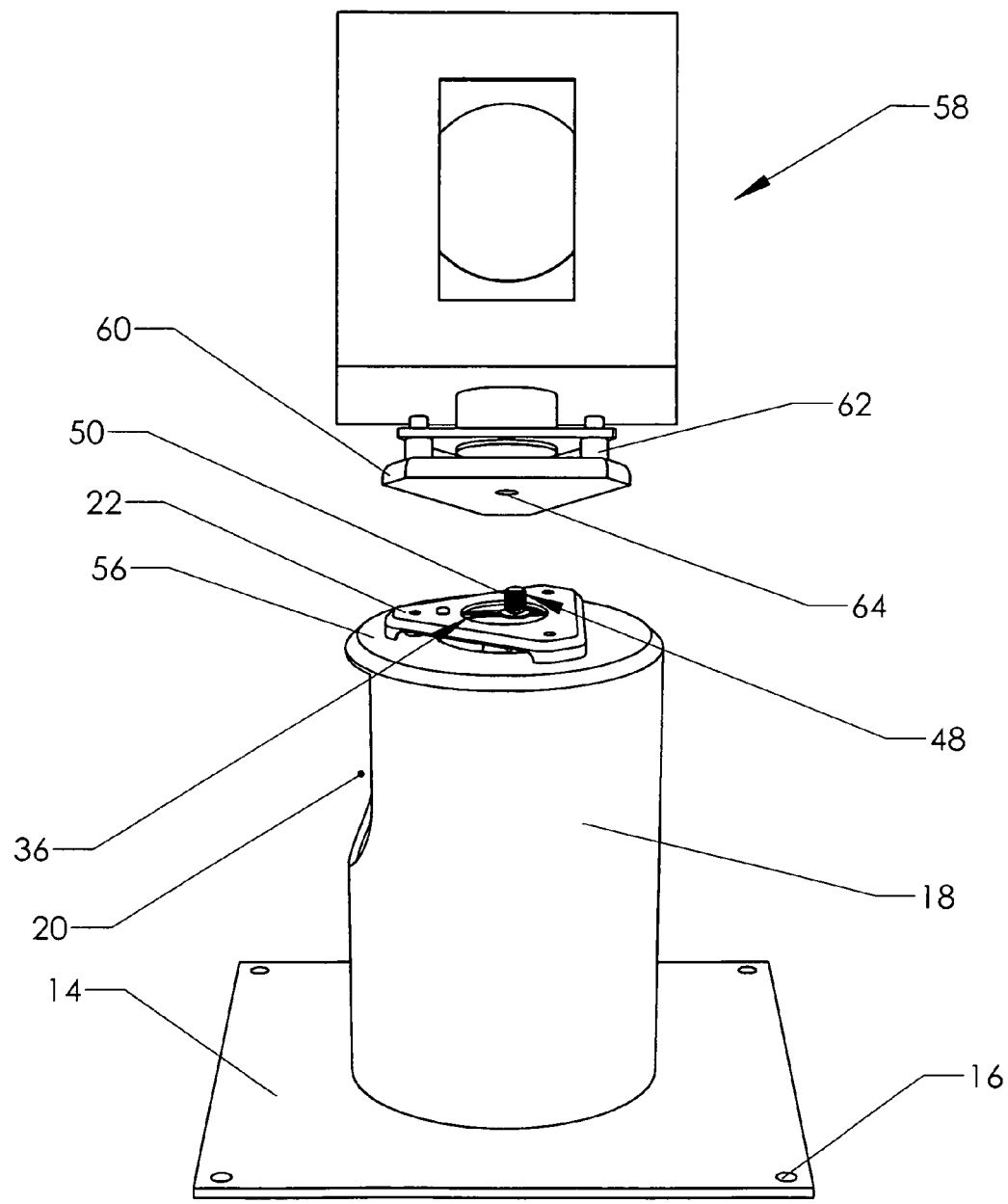
FIG. 9 is a perspective view, showing the present invention ready to be attached to a laser scanner.

The illustration in FIG. 9 portrays the present invention ready to accept a prior art laser scanner 58. Laser scanner 58 has a scanner base 60 and scanner leveling knobs 62. Scanner base 60 has a female receiver 64 designed to accept threads 50 of attachment screw 48. The user can reach into access opening 20 and tighten attachment screw 48 into female receiver 64. Scanner knobs 62, known in the art, allow the user to make fine adjustments and level laser scanner 58. When installed scanner base 60 sits on triangle bracket 22.

Figure 10:
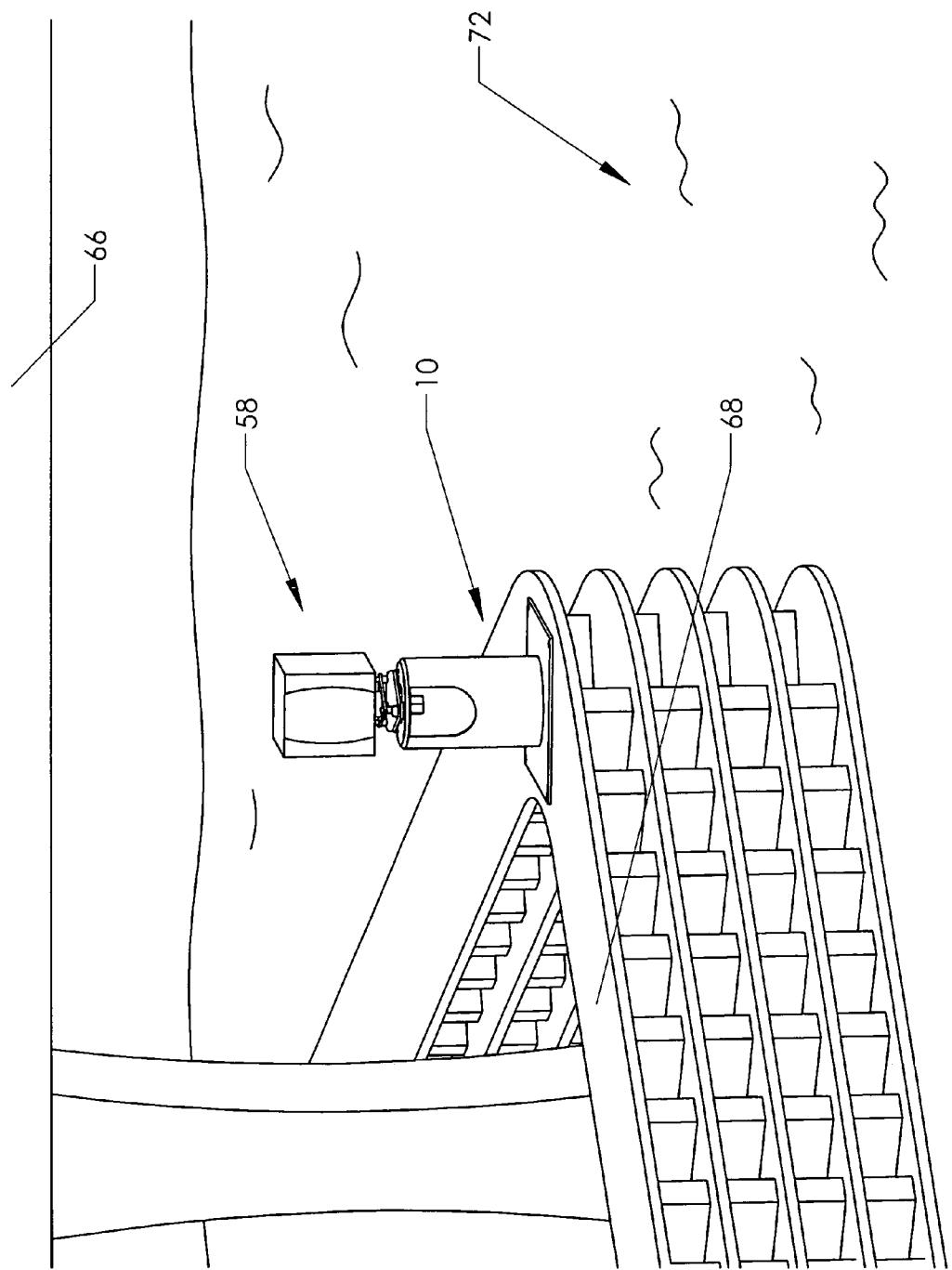
FIG. 10 is a perspective view, showing the present invention in use underneath a bridge over water.

FIG. 10 shows the present invention mounted to a bridge fender 68 adjacent to the water 72. It is difficult to find a sturdy mount to scan a bridge located over water. Therefore, in the present embodiment mount 10 can be permanently attached to bridge fender 68 allowing laser scanner 58 to scan bridge underside 66 to obtain information about bridge degradation over time. Laser scanner 58 would be easily attached and detached in order to perform the necessary scan and only left in position when performing the scan.

Figure 11:
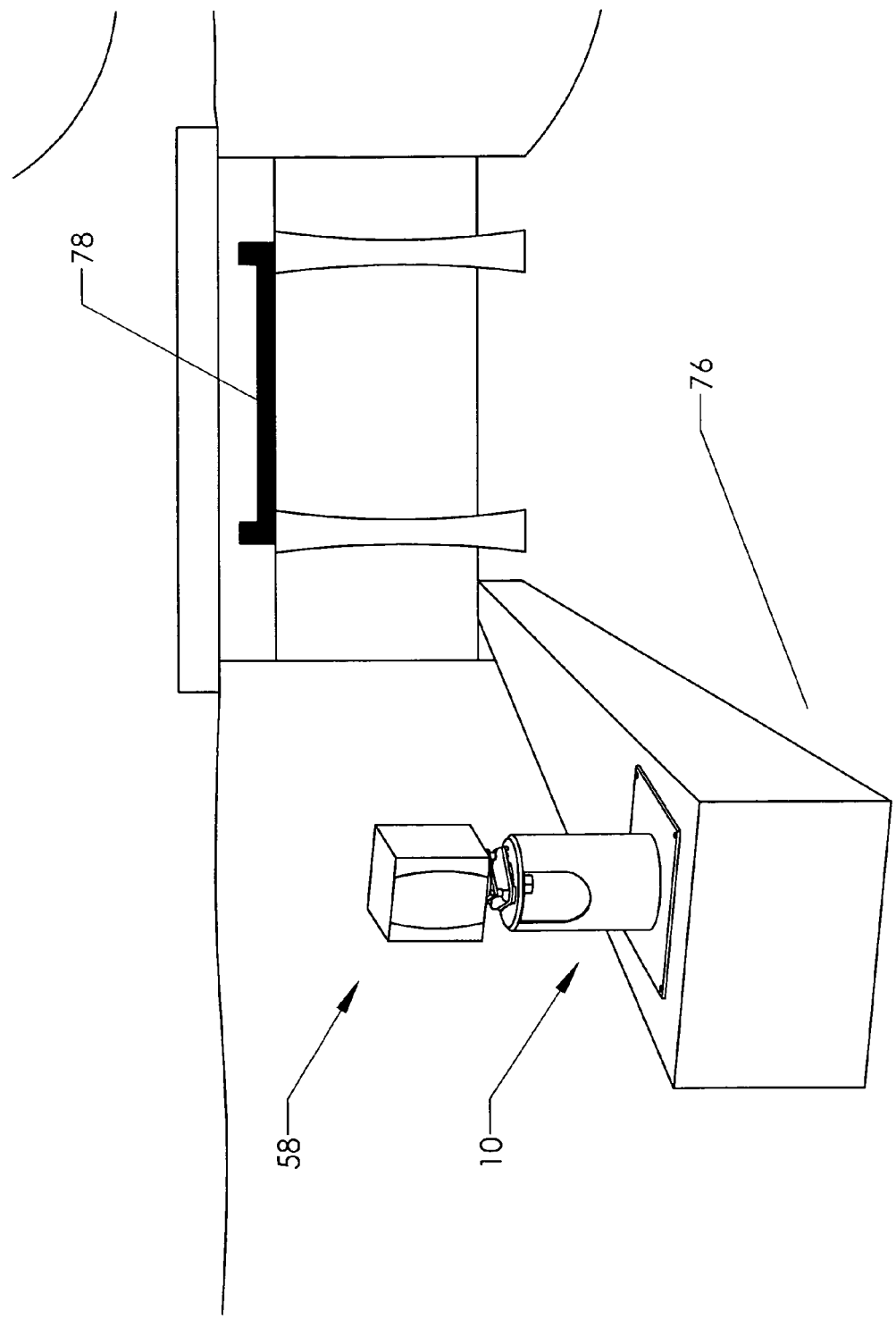
FIG. 11 is a perspective view, showing the present invention in use on a highway.

As illustrated in FIG. 11 laser scanner 58 could also be attached to a concrete barrier 76 on the side of a highway in order to scan bridge 78. In the preferred embodiment mount 10 can be permanently affixed to concrete barrier 76 in order to provide a fixed location for laser scanner 58 to accurately measure the degradation of bridge 78 over time. Laser scanner 58 can be easily removed from the location but the position of the mount 10 does not change. While laser scanner 58 has been used in the corresponding illustrations the present invention could be employed to mount many other devices.

The preceding description contains significant detail regarding the novel aspects of the present invention. It should not be construed, however, as limiting the scope of the invention but rather as providing illustrations of the preferred embodiments of the invention. As an example, the base 12 and triangle bracket 22 could be one integrated unit. Additionally, support 18 could be shaped as a rectangle as opposed to a cylinder. Thus, the scope of the invention should be fixed by the following claims, rather than by the examples given.

Having described my invention, I claim:
1. A mount for attaching a device to a fixed object, said mount comprising:
   a. a base having a lower end and an upper end;
   b. wherein said base includes:
      i. a base plate, located at said lower end of said base, said base plate having a bottom and a top;
      ii. a support attached to said top of said base plate, said support having a bottom, a top and a hollow interior;

iii. an access opening through said support into said hollow interior, said access opening located proximate said upper end of said support;

c. an attachment screw having a threaded male portion;

d. a ledge attached to said top of said support, wherein said ledge includes a central opening;

e. a triangle bracket attached to said support of said ledge, wherein said triangle bracket has a center and a perimeter;

f. wherein said triangle bracket includes:
   i. an opening located at said center of said triangle bracket; and
   ii. a pivot bracket located at said center of said triangle bracket across said opening;
   iii. wherein said pivot bracket is pivotally attached to said triangle bracket such that said pivot bracket pivots across said opening of said triangle bracket;

g. wherein said attachment screw is installed within said pivot bracket with said threaded male portion extending upwards so that said threaded male portion extends above said triangle bracket.

2. A mount as recited in claim 1, wherein said base plate of said base further comprises a plurality of screws, wherein said plurality of screws are configured to attach said base plate to said fixed object.

3. A mount as recited in claim 1, wherein said pivot bracket further comprises two runners.

4. A mount as recited in claim 3, wherein said two runners are approximately parallel to one another.

5. A mount as recited in claim 4, wherein said pivot bracket has a slot formed by said two runners.

6. A mount as recited in claim 5, wherein said slot has a first end and a second end, wherein said first end has a width that is greater than said width of said second end.

7. A mount as recited in claim 6, wherein said slot is configured to accept said attachment screw at said first end of said opening.

8. A mount as recited in claim 1, wherein said attachment screw further comprises an anchor.

9. A mount as recited in claim 1, wherein said mount is made of aluminum.

10. A mount as recited in claim 1, wherein said mount is made of stainless steel.

11. A mount for a device, said mount comprising:

a. a base having a lower end and an upper end;

b. wherein said base includes:
   i. a base plate, located at said lower end of said base, said base plate having a bottom and a top;
   ii. a support attached to said top of said base plate, said support having a lower end, an upper end and a hollow interior;
   iii. wherein said support includes a ledge proximate said upper end of said support;
   iv. wherein said ledge of said support has a central opening through the center of said ledge into said hollow interior;
   v. an access opening through said support into said hollow interior, said access opening located proximate said upper end of said base;

c. an attachment screw having a threaded male portion and an anchor;

d. a triangle bracket having a center and a perimeter;

e. wherein said triangle bracket includes:
   i. an opening located at said center of said triangle bracket;
   ii. a pivot bracket located at said center of said triangle bracket;
   iii. a plurality of fixed bolts, located at said perimeter of said triangle bracket;

f. wherein said plurality of fixed bolts attach said perimeter of said triangle bracket to said ledge of said support of said base; and g. wherein said attachment screw is installed within said pivot bracket with said threaded male portion extending upwards so that said threaded male portion extends above said triangle bracket.

12. A mount as recited in claim 11, wherein said support is welded to said base plate.

13. A mount as recited in claim 11, wherein said pivot bracket further comprises two runners.

14. A mount as recited in claim 13, wherein said two runners are approximately parallel to one another.

15. A mount as recited in claim 14, wherein said pivot bracket has slot formed by said two runners.

16. A mount as recited in claim 15, wherein said slot has a first end and a second end, wherein said first end has a width that is greater than said width of said second end.

17. A mount as recited in claim 16, wherein said slot is configured to accept said anchor of said attachment screw at said first end of said opening.

18. A mount as recited in claim 11, wherein said mount is comprised of aluminum.

19. A mount as recited in claim 11, wherein said mount is comprised of stainless steel.

* * * * *